Figure 2:
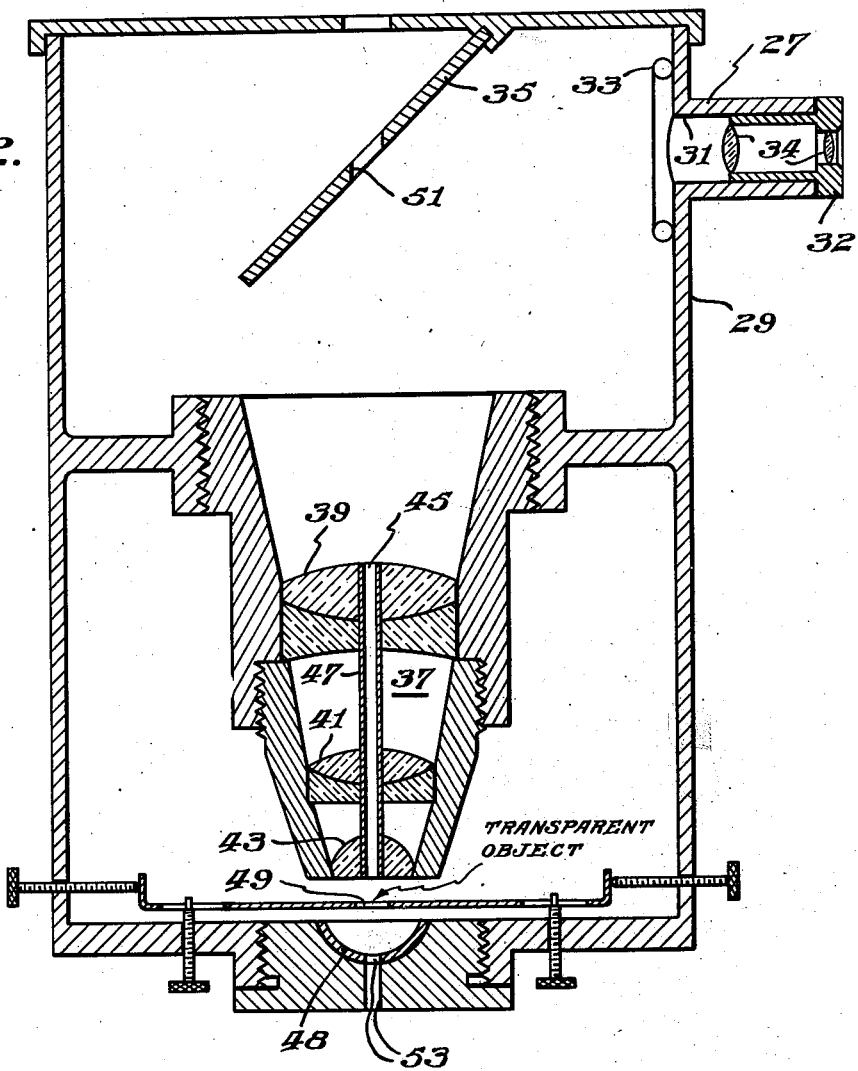

Nov. 10, 1942.  L. MARTON  2,301,302
MICROSCOPE
Original Filed Jan. 27, 1939  2 Sheets-Sheet 1
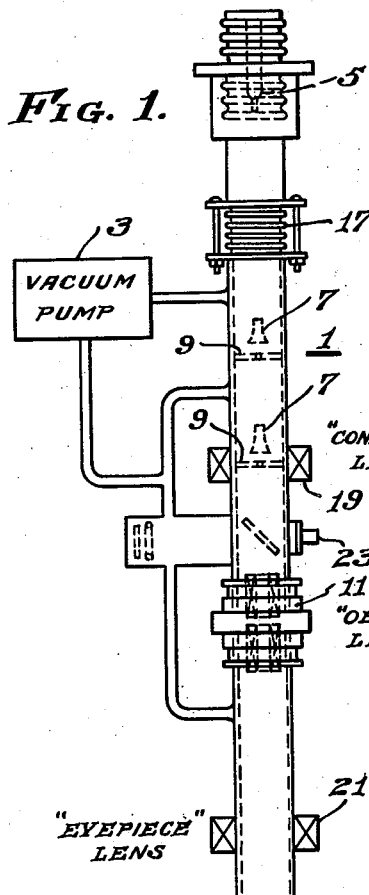
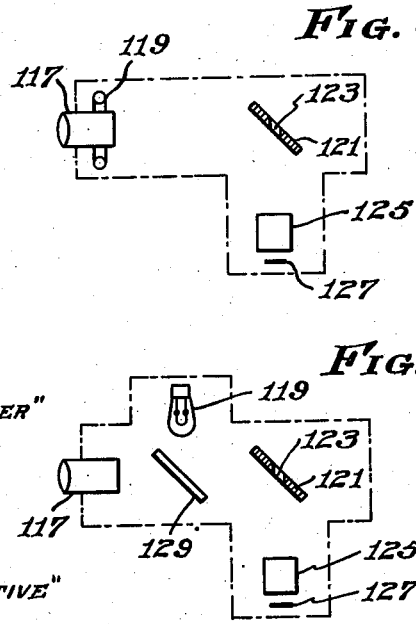
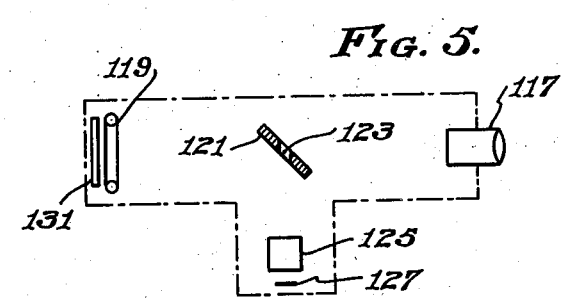
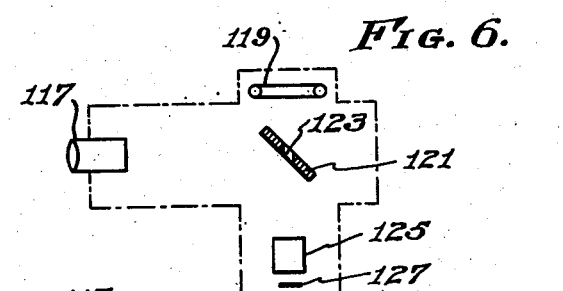
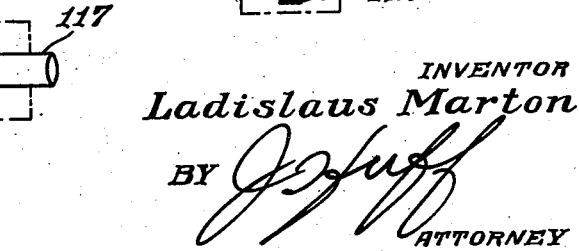
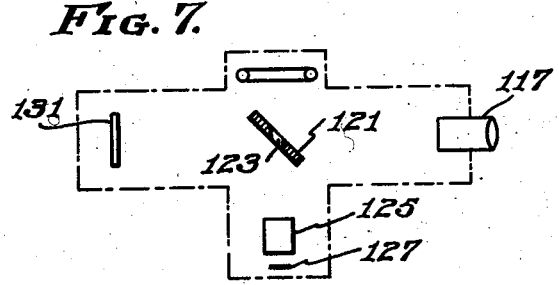
INVENTOR
Ladislaus Marton
BY
ATTORNEY Patented Nov. 10, 1942

2,301,302

UNITED STATES PATENT OFFICE 2,301,302

MICROSCOPE

Ladislaus Marton, Collingswood, N. J., assignor to Radio Corporation of America, a corporation of Delaware Original application January 27, 1939, Serial No. 253,029. Divided and this application November 21, 1939, Serial No. 305,432

7 Claims. (Cl. 88—39)

This application is a division of applicant's copending application Serial No. 253,029, filed January 27, 1939, and entitled "Electronic and light microscopes," which latter application has issued as Patent 2,233,286, February 25, 1941. While the said application relates to combined light and electronic microscopes, the instant invention relates to a light microscope in which light is concentrated on the object to be imaged by means of reflectors. More particularly, the invention relates to a light microscope in which light may be passed through a lens system, through the object to be imaged, and reflected through the object and the lens system to an eyepiece.

The invention has particular utility in a combined electronic and light microscope in which the object is located at a common focal point to allow for registering simultaneously light and electronic images. This arrangement is best made by providing a straight uninterrupted path for the electron beam which forms the electron image. Such path may be through apertures in the light lenses and reflectors. If the microscope is used only as a light microscope, the apertures may be omitted. It is one of the objects of the invention to provide a light microscope in which an aperture is arranged in the lens system. Another object is to provide means in a light microscope for concentrating light on the specimen or object after the light has passed through the specimen. An additional object is to condense light on a specimen or object by means of a spherical reflector. A further object is to provide means having especial utility in an electronic microscope, for forming a light image of the specimen or object to be imaged.

The invention will be described by reference to the accompanying drawings, in which Figure 1 is an elevational view of one embodiment of an electronic and light microscope; Figure 2 is an enlarged sectional view of the light-lens system in the microscope of Figure 1; and Figures 3, 4, 5, 6 and 7 are schematic views of various arrangements of light lenses which may be used in combination with the reflector.

Referring to Fig. 1, an envelope 1 is exhausted by a vacuum pump 3. Within the envelope are arranged an electron-emitting element 5, deflector plates 7, diaphragms 9, a combined light objective and electronic lens 11, which will be more fully described hereinafter, a photographic plate holder 13, and a fluorescent screen 15. External to the envelope is arranged a flexible joint 17, which permits the initial centering of the cathode ray stream. The envelope also includes electronic lenses 19, 21. A suitable eyepiece 23 is arranged on the side of the envelope and a window 25 is arranged at the base of the envelope for viewing the fluorescent screen.

The light lens system of the microscope will be described by referring to Fig. 2. A structure 27 for housing an eyepiece is fastened to the casing 29. The eyepiece 32, including suitable lenses 34, is arranged within an aperture 31. A source of light 33, which may be an electric light with an annular-shaped envelope, is located within the envelope. A mirror 35 is positioned at a suitable angle with respect to the eyepiece for reflecting the light on the objective lens 37. The objective lens may consist of the conventional arrangement of refractive lenses 39, 41, 43 of different materials arranged to correct for aberrations. A small aperture 45 is located substantially at the center of the several lenses. The aperture is used in combined electronic and light microscopes more fully disclosed in applicant's parent application to which reference has been made. The aperture may be omitted if only the light microscope is used.

If the light microscope is used with the electronic microscope, electrons are passed through the aperture which is preferably lined with a metallic tube 47 or conductive coating. The tube or coating is connected to ground by means of a conductive coating transparent to light which is arranged on the surface of one of the lenses. The conducting coat is connected to the metallic elements of the microscope. The function of the metallic tube which lines the apertures is to prevent an accumulation of electrons on the lens system which might diffuse the electron beam.

Opposite the last lens 43 of the light objective lens system is arranged a spherical reflector 48 which reflects the light through the specimen 49. The specimen is positioned at the center of curvature of the reflector. While any suitable means may be used to position and support the object or specimen, one suitable adjustable mechanism is shown in the copending application Serial No. 265,375, filed March 31, 1939, by Ladislaus Marton, and entitled "Device for inserting objects into a vacuum," issued as Patent 2,209,973, November 12, 1940. At this position, the light from the objective lens system will be concentrated, after reflection, on the specimen with the full numerical aperture of the objective. The use of a spherical reflector for condensing the light at the specimen is not only a very effective method of illuminating the specimen but also saves space, which is at a premium in the region of the specimen. The image of the specimen passes through the lens system to the mirror 35 where it is viewed in the conventional manner. It will be noted that both the mirror 35 and the spherical reflector 48 include apertures 51, 53 through which the electron beam may be passed.

While one arrangement of the light source, light reflector and eyepiece has been shown in Figs. 1 and 2, it should be understood that other arrangements may be employed in connection with Figs. 3 through 7 to which reference will now be made. Similar reference numerals will indicate similar parts.

In Fig. 3, the eyepiece 117 is surrounded by the light source 119. The mirror 121 includes an aperture 123. The objective lens is represented by the block 125 and the specimen by the line 127. This arrangement is not essentially different from the arrangement illustrated in Fig. 2.

In Fig. 4, the light 119 is arranged at a point more remote from the eyepiece 117 and is reflected by half-silvered mirror 129. The balance of the arrangement is similar to Fig. 3.

In Fig. 5, the eyepiece 117 is arranged so that the image of the specimen 127 which is reflected by a mirror 131 is viewed through the aperture 123 in the mirror 121 which reflects light from the source 119.

In Fig. 6, the light source 119 is arranged above the mirror 123 which is half-silvered and is remote from the eyepiece 117. The half-silvered mirror 121 passes the light from the source 119 to the objective lens 125 and reflects the image of the specimen 127 upon the eyepiece 117.

In Fig. 7, the light source and mirror 121 are arranged as in Fig. 6, but, in order to obtain a longer distance from the specimen 127 to the eyepiece 117, an additional mirror 131 is arranged as in Fig. 5.

Thus I have described a microscope in which the specimen may be observed by passing light through the lens system and the specimen and hence to a spherical reflector which condenses or concentrates the light on the specimen. The reflected light passes through the lens system to the eyepiece, where the image may be observed. Various arrangements of light systems may be employed to obtain the desired focal conditions. When used in combination with an electronic microscope, the light lens and reflectors are apertured for the electron beam. The aperture in the light lens has no detrimental effect on the image but a larger lens is required to compensate for the hole.

I claim as my invention:

1. A light microscope for use in conjunction with apparatus of the type adapted to apply an electron beam to the object to be observed, said light microscope comprising a source of light, a light refractive objective lens located on one side of the object and adapted to transmit an optical image of said object, a mirror for directing said light to said objective lens, a reflector located on the other side of said object and adapted to concentrate the light which passes through said lens upon said object, and means for viewing the image transmitted in the return direction through said objective lens; said mirror, said objective lens and said reflector each being provided with an aperture through which said electron beam may be passed substantially unimpeded.

2. A microscope for imaging an object including, in combination, a refractive objective lens, a spherical reflector, said lens and said spherical reflector being coaxial and located on opposite sides of the object to be imaged, a source of light located on the objective lens side of said object, means located on the objective lens side of said object for directing said light on said lens, said lens directing light passing therethrough upon said spherical reflector, said reflector reflecting said light through said object and thence through said lens, an eyepiece disposed at an angle with respect to said axis and on the objective lens side of said object, and means located on the objective lens side of said object and in front of said eyepiece for directing light reflected from said spherical reflector and passing back through said refractive objective lens upon said eyepiece.

3. A microscope for imaging an object including, in combination, a refractive objective lens, a spherical reflector, said lens and said spherical reflector being coaxial and located on opposite sides of the object to be imaged, a source of light located on the objective lens side of said object, means located on the objective lens side of said object for directing said light on said lens, said lens directing light passing therethrough upon said spherical reflector, said reflector reflecting said light through said object and thence through said lens, an eyepiece disposed at an angle with respect to said axis and on the objective lens side of said object, and a mirror inclined at 45° to said axis and located on the objective lens side of said object and in front of said eyepiece for directing light reflected from said spherical reflector and passing back through said refractive objective lens upon said eyepiece.

4. A microscope for imaging an object including, in combination, a refractive objective lens, a spherical reflector, said lens and said spherical reflector being coaxially located on opposite sides of the object to be imaged, a source of light located on the objective lens side of said object and a mirror including an aperture located and on the objective lens side of said object for directing said light upon said lens, said directed light passing through said lens being reflected by said spherical reflector upon said object and thence upon said lens, and an eyepiece so arranged with respect to said mirror that the light passing back through said refractive objective lens after reflection from the spherical reflector is directed upon said eyepiece.

5. A microscope for imaging an object including a source of light located on one side of said object, a refractive objective lens located on said one side, means located on said one side for directing said light onto said lens, and a spherical reflector positioned on the other side of said object for condensing said light after it passes through said lens and through said object on the portion of the object to be imaged and thence through said refractive objective lens, said portion being positioned at the focus of said lens.

6. A microscope for imaging an object including a source of light located on one side of said object, a refractive objective lens for condensing said light on an object and for imaging said object located on said one side, and means located on the other side of said object for reflecting on said object at least a portion of said light after it passes through said lens and through said object and thence through said refractive objective lens to form an image of said portion of said object.

7. The invention as set forth in claim 6 and wherein means are provided for discharging electrons reaching the walls of said apertures.

LADISLAUS MARTON.